United States Patent
Auge Pujadas et al.

(10) Patent No.: US 10,601,773 B2
(45) Date of Patent: Mar. 24, 2020

(54) METHOD AND A SYSTEM FOR USING RELAYS FOR NETWORK OPTIMIZATION IN IP-BASED COMMUNICATION NETWORKS

(71) Applicant: TOKBOX INC., San Francisco, CA (US)

(72) Inventors: Estanislau Auge Pujadas, San Francisco, CA (US); Badri Rajasekar, San Francisco, CA (US); Manas Pradhan, San Francisco, CA (US); Venkat Venkataraman, San Francisco, CA (US)

(73) Assignee: NEXMO, Inc., San Francisco, CA (US)

( * ) Notice: Subject to any disclaimer, the term of this patent is extended or adjusted under 35 U.S.C. 154(b) by 184 days.

(21) Appl. No.: 15/787,153

(22) Filed: Oct. 18, 2017

(65) Prior Publication Data

US 2019/0116154 A1   Apr. 18, 2019

(51) Int. Cl.
   *G06F 15/16* (2006.01)
   *H04L 29/12* (2006.01)
   (Continued)

(52) U.S. Cl.
   CPC ...... *H04L 61/2589* (2013.01); *H04L 67/1074* (2013.01); *H04L 67/14* (2013.01); *H04L 45/38* (2013.01); *H04L 61/2575* (2013.01)

(58) Field of Classification Search
   CPC .............. H04L 67/104; H04L 61/2575; H04L 61/2589; H04L 61/2567; H04L 65/1033; H04L 29/12509; H04L 12/1827
   (Continued)

(56) References Cited

U.S. PATENT DOCUMENTS

| 2017/0142164 A1* | 5/2017 | Moore | H04L 65/1069 |
| 2018/0097863 A1* | 4/2018 | Ivov | H04L 65/1069 |

FOREIGN PATENT DOCUMENTS

EP   2475145 A1   7/2012

OTHER PUBLICATIONS

P. Saint-Andre, &yet, s. Ibarra, AG Projects, E. Ivov; Interworking between the Session Initiation Protocol (SIP) and the Extensible Messaging and Presence Protocol (XMPP): Media Sessions draft-ietf-stox-media-07; Jul. 20, 2015; Network Working Group Group Internet Draft; 1-28 pages. (Year: 2015).*

(Continued)

*Primary Examiner* — Wing F Chan
*Assistant Examiner* — Andrew Woo
(74) *Attorney, Agent, or Firm* — FisherBroyles, LLP; Joseph Pagnotta (57) ABSTRACT

A method and a system for using relays for network optimization in IP-based communication networks. The method includes negotiating a communication session between two peers connected to the Internet via a signaling server, at least one of the two peers having data traffic restrictions and requiring a relayed route to connect with the other peer; identifying, by each peer, a plurality of candidate contact addresses, including IP address, port and protocol, that the peer can send to the other peer, so that the other peer can find a route to connect to that peer; filtering out any candidate contact address of the plurality of identified candidate contact addresses that is not a relayed candidate contact address, providing a list of relayed candidate contact addresses; and establishing a connection between the two peers via one relayed candidate contact address of the list of relayed candidate contact addresses using a TURN server.

18 Claims, 4 Drawing Sheets

(51) Int. Cl.
  *H04L 29/08* (2006.01)
  *H04L 12/721* (2013.01)
(58) Field of Classification Search
  USPC .................................................. 709/227, 228
  See application file for complete search history.

(56) References Cited

OTHER PUBLICATIONS

European Search Report for EP 18199725 for Toxbox Inc. dated Feb. 11, 2019.

Uberti Google C Jennings Cisco E Rescorla J et al: "JavaStript Session Establishment Protocol; draft-ietf-rtcweb-jsep-24.txt", Javascript Session Establishment Protocol; Draft-IETF-RTCWEB-JSEP-24. Txt; Internet-Draft: Network Working Group, Internet Engineering Task Force, IETF; Standardworkingdraft, Internet Society (!Soc) 4, Rue Des Falaises CH-1205 Geneva, Switzerland, No. 24, Oct. 10, 2017 (Oct. 10, 2017), pp. 1-115, XP015122160.

Uberti G Shi Eh Google J: "WebRTC IP Address Handling Requirements; draft-ietf-rtcweb-ip-handling-04.txt", WebRTC IP Address Handling Requirements; Draft-IETF-RTCWEB-IP-Handling-04. txt; Internet-Draft: Network Working Group, Internet Engineering Task Force, IETF; Standardworkingdraft, Internet Society (!SOC) 4, Rue Des Falaises CH-1205 Geneva, Switzerlan, No. 4, Jul. 4, 2017 (Jul. 4, 2017), pp. 1-9, XP015120899.

\* cited by examiner

METHOD AND A SYSTEM FOR USING RELAYS FOR NETWORK OPTIMIZATION IN IP-BASED COMMUNICATION NETWORKS

FIELD OF THE INVENTION

The present invention generally relates to Internet communications. In particular, present invention relates to a method, and to a system, for using relays for network optimization in IP-based communication networks using a TURN server either for NAT traversal or network policy issues (e.g. compliance and/or quality optimization).

BACKGROUND OF THE INVENTION

The Internet comprises a very heterogeneous set of NATs, in-the-middle components and endpoints that make it hard under certain circumstances for different endpoints (e.g. users or clients) to reach each other.

Real time communications (RTC) is a branch of telecommunications that involves low latency packet routing on networks between two peers. Different examples of RTC technologies are the PSTN and VoIP. On the other hand, the Real-time Transport Protocol (RTP) is a protocol originally designed for two peers to transmit latency sensible content (commonly, audio and video) between them. RTP is used extensively in telephony, video conference protocols and television services, among others.

WebRTC is an API and a set of protocol implementations that enable browsers to stream media real time in a peer to peer fashion. WebRTC can also be compiled and linked independently against other applications to be used outside the browser. The real advantage of WebRTC is that is available in current versions of Chrome™, Firefox™, Opera™ and Microsoft™ and Apple™ are adding support for their respective browsers as well. Users can use WebRTC based applications on their browsers without the need of installing third party plugins or apps.

When two peers want to send media packets to each other using the standard, the first is finding a possible route between the two peers. When deciding how to route packets, peers using WebRTC may use the following protocols: STUN, TURN and ICE.

Next a brief explanation of what each of these protocols is used for, according to the state of the art, is given.

STUN, which stands for Session Traversal Utilities for NAT, is a protocol that provides a mechanism for endpoints with a private IP address and port to find out the IP address and port allocated by a NAT. Additionally, it provides a mechanism to keep the NAT binding alive.

By using STUN, a peer on the Internet might be able to provide other peers on the Internet with a pair of a public IP address and port that other peers can use to send packets to the former one. STUN is a protocol based on sending UDP packets between clients. However, since some firewalls block UDP traffic, or it is not possible for another peer to reach out to the provided IP address of the former peer, a more sophisticated mechanism to cover most scenarios is needed.

TURN, which stands for Traversal Using Relays around NAT, is a protocol that enables two peers in the Internet sending packets to each other even if they cannot reach each other directly. When two peers on the Internet first try to find a route to send packets to each other, they use hole punching techniques to find a direct route, which is a route without any packet relaying. However, if both peers are behind NATs that do not behave in a standard way, peers may consider using a route in which packets are relayed between them.

A TURN server with a public IP address is able to relay packets between peers that are behind NATs in those conditions. In a RTC scenario, it is common to use the RTP protocol on top of UDP. However, since some peers may be behind firewalls that block all UDP traffic, TURN supports besides User Datagram Protocol (UDP), Transmission Control Protocol (TCP) and Transport Layer Security (TLS). These covers most firewalls configurations for outgoing traffic to the Internet.

ICE, which stands for Interactive Connectivity Establishment, is a protocol used for peers to find enough information about their network topology to find a route through which they can talk to each other. Initially, ICE assumes a communication channel between peers through which they can negotiate a session using an offer/answer model, by using a signaling server. Once the peers have negotiated a session they try to find a route between them. In order to do that, there is a stage in which clients gather candidate contact addresses (sets of IP address, port and protocol) that they can send to the other peer, and the other peer can use to try to reach them. In the candidate gathering state, the STUN and TURN protocols are used in order to identify different types of candidates and increase the chances of finding a route between them.

In the context of ICE there is the concept of ICE servers. ICE servers are servers that support the STUN and or TURN protocols. ICE uses the ICE servers to aid the client to gather different kind of ICE candidates in order to find a viable route to the other peer.

The following is a list of the types of candidate contact addresses that can be provided by a peer.

Host candidate: the host candidate is the IP address of the interface bound and the port.

Peer reflexive candidate: when a peer receives a STUN packet with a mapped address that has not already been gathered by the peer, the peer stores it as a peer reflexive candidate Server reflexive candidate: is a translated address on the public side of the NAT.

Relayed candidate: is the address of a TURN server that can be used to find a relayed route to the other peer.

The problem statement addressed by present patent application is how to force peers to route packets through a particular server in the Internet in certain scenarios which impose restrictions on data traffic, for instance those networks that require outbound traffic towards the Internet to be routed through certain network nodes. The previous mentioned protocols are used as a basis for the proposed solution, but there is no mechanism defined in the standards and RFCs that allows implementors to force certain routes for peers. There are different scenarios in which it may make sense to force peers to use desired or even necessary routes. A couple of scenarios in which the solution is useful will be listed, but it is all based on the same concept of forcing a route between two peers on the Internet.

Also, another important consideration is that for Peer A and Peer B to start an initial negotiation using the ICE protocol a signaling server needs to be present. The server will provide a means for the two connections to negotiate the session with the respective offer/answer and the candidate exchange. The signaling server can use a protocol based on TCP or UDP depending on the requirements of the application, a protocol such as SIP supports both protocols.

So, the problem is twofold: it has to be considered how Peer A can reach Peer B, but also how Peer A can reach the signaling server for the initial negotiation.

More solutions are therefore needed in order to set up a successful communication between two peers when one of the peers, or both, has data traffic restrictions.

DESCRIPTION OF THE INVENTION

Aspects described herein provide a method for using relays for network optimization in IP-based communication networks, comprising negotiating a communication session between two peers connected to the Internet, wherein the negotiation is performed via a signaling server, and wherein one of the two peers has data traffic restrictions and requires a relayed route to connect with the other peer; identifying, by each peer, a plurality of candidate contact addresses, including IP address, port and protocol, that the peer can send to the other peer, so that the other peer can find a route to connect to that peer through said contact address; filtering out any candidate contact address of the plurality of identified candidate contact addresses that is not a relayed candidate contact address, providing a list of relayed candidate contact addresses; and establishing a connection between the two peers via one relayed candidate contact address of the list of relayed candidate contact addresses using a TURN server.

According to the proposed method, the filtering out step may be performed either by the peer having data traffic restrictions or by the signaling server.

In an embodiment, the peer not having data traffic restrictions is a media server which can act as a Selective Forwarding Unit (SFU) or as a Multipoint Control Unit (MCU) wants to exchange media with the peer having restrictions.

In an embodiment, the negotiation is performed using the ICE protocol and the communication session comprises a RTP session using WebRTC. The signaling server may use a protocol based on either TCP or UDP.

In an embodiment, the identification of the candidate contact addresses comprises using a STUN protocol and the TURN protocol.

In an embodiment, before the negotiation is performed, the method determines whether the peer, peers, has data traffic restrictions by accessing a register stored in a server, the register storing an IP address of the peer, peers, having data traffic restrictions.

Additional aspects described herein also relate to a system for using relays for network optimization in IP-based communication networks, comprising:
two peers adapted to be connected to the Internet, wherein one of the two peers having data traffic restrictions and requiring using a relayed route to connect with the other peer;
a signaling server adapted to negotiate a communication session between the two peers; wherein the two peers being adapted to further identify a plurality of candidate contact addresses, including IP address, port and protocol, that the peer can send to the other peer to find a route between them; and
a TURN server adapted to establish a connection between the two peers via a relayed candidate contact address, the relayed candidate contact address being part of a list of relayed candidate contact addresses provided after having filtered out the plurality of identified candidate contact addresses.

The system preferably also includes a server storing a register having an IP address of the peer having data traffic restrictions.

Therefore, present invention provides a solution allowing any endpoint connected to the Internet to reach out to any other endpoint, even under NAT configurations or firewall configurations having very restrictive environments. By forcing endpoints to use a TURN server to relay all the packets between them even if it is possible for them to talk directly, network policy requirements imposed on subnetworks can be addressed, for example. By using this approach, present invention can increase the number of potential endpoints that can use WebRTC video solutions, such as TokBox™, and be compliant with more networks and organizations.

These open the possibilities of providing a better quality of service by using an optimized route. Besides, being compliant with network requirements allows enabling peers that find themselves in restrictive networks to send and receive traffic with peers outside the network, or improving geo distributed load balancing.

BRIEF DESCRIPTION OF THE DRAWINGS

The present invention is described in conjunction with the appended figures.

DETAILED DESCRIPTION OF PREFERRED EMBODIMENTS

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Present invention provides a method, and a corresponding system, to force two peers 100, 101, 102, 200 connected to a communications network such as the Internet 400 to use a TURN server to establish a communication channel with each other.

Under some circumstances it is desirable to force peers to use TURN for relaying all the packets between them, either for NAT traversal or network policy issues (e.g. compliance and/or quality optimization).

Figure 1:
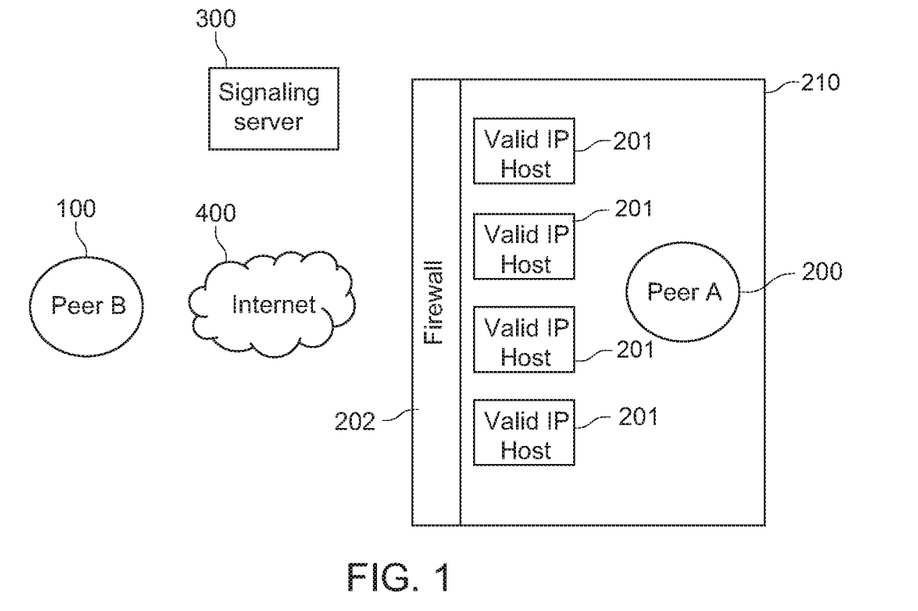
FIG. 1 illustrates an example of the compliance scenario.

FIG. 1 shows an example of the compliance scenario. Peer B 100 is a peer that has a public IP address or can provide a public IP address through which is reachable, either by using STUN or TURN and can be found using the ICE protocol. Peer A 200 is a peer in an internal network, and only a limited number of hosts 201 in such network are allowed to send packets to and receive packets from the public Internet 400. In such scenario, it is still possible that even if the firewall 202 rules allow a host 201 to reach out to the Internet 400, for network policy reasons peer A 200 may not be allowed to send packets directly through the firewall 202, and thus data traffic from peer A 200 to the Internet 400 may be blocked at some point. In some deployments even if TURN/STUN/ICE operations conducted directly from Peer A 200 succeed, further traffic may be later blocked.

In such a scenario, a mechanism through which it can be guaranteed that peer A 200 will be able to find a route to peer B 100 that can bypass the firewall 202 following the firewall rules, and is compliant with the internal network requirements, is needed. The problem of this approach is that peer A 200 may not be aware of whether it finds itself in such a network. There is no guarantee that it will be completely blocked to interact with other peers in the public Internet 400, which makes it very difficult or impossible to come up with an automatic mechanism for a peer to identify whether it should use only relayed routes based on the network topology.

It is assumed that peer A 200 can reach any Valid IP host 201, that is, a host within the internal network that is allowed, by the network policy, to send packets to and receive packets from the public Internet 400, and thus can use ICE effectively to find a route through the public Internet to reach peer B 100.

On the other hand, two peers that need to find a route with each other will have to do so through the public Internet 400. In a normal scenario, as in FIG. 2, it can be seen that peer A 200 and peer B 100 find a route between them through the public Internet 400. One of the characteristics of the Internet 400 is that it is very unpredictable to know which routes peer B 100 and peer A 200 will be able to find. When dealing with real time systems, which are very sensitive to latency, network predictability is very important to optimize quality of service, which comes from network bandwidth, speed and reliability. So, as a service provider it may be interesting to force peers to use specific routes that are optimized for this scenario.

Figure 2:
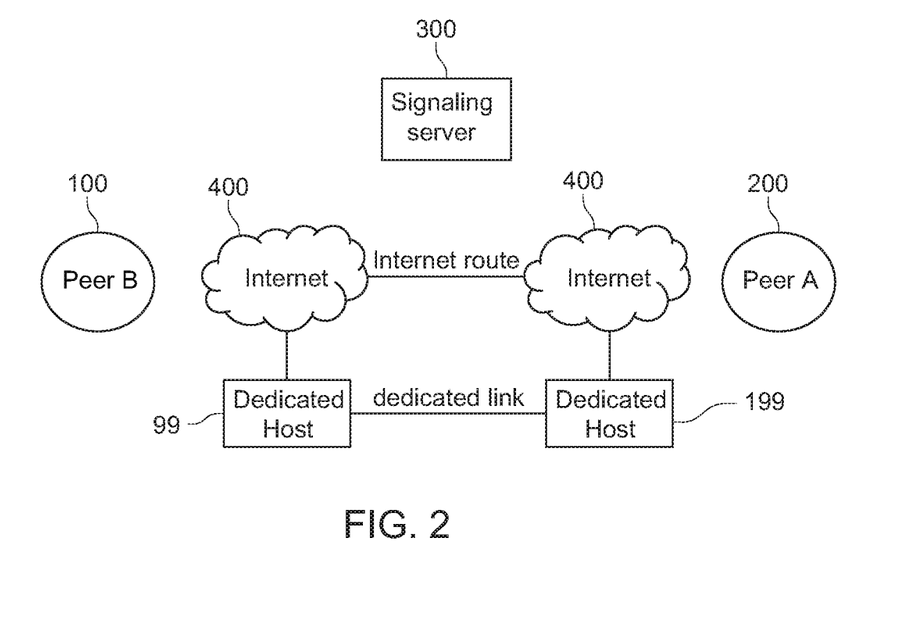
FIG. 2 illustrates an example of the quality optimization scenario.

Depending on the location of the peers 100, 200, the route may not provide the quality requirements necessary for real time streaming. So, if multiple data centers are available with dedicated networking between the datacenters, it is desirable to force clients to use these optimized routes, which is connecting through dedicated hosts in the datacenters 99, 199, instead of letting peers send packets through any route they find in the Internet 400.

In an embodiment, to determine if a peer has data traffic restrictions, or is subject to traffic optimizations through dedicated links, a register, or static table, storing the IP addresses of the hosts in a network of such characteristics, for instance a set of IP address ranges, can be managed. If a peer's IP address belongs to a certain range of IP addresses, it is assumed that the peer needs to be forced to use only relayed routes. This register may be stored in a server (not illustrated in the figures) accessible even from those constrained networks with data traffic restrictions and that would be checked before starting the ICE procedure. In the case of network optimization, an implementor may want to force always a specific route, so there might be no need to execute any additional procedure.

Once determined that peer A 200 satisfies the condition in which a route needs to be forced, the proposed method allows forcing peer A 200 to use a relayed route. In order to do that, in an embodiment, since peer A 200 and peer B 100 are negotiating an RTP session using WebRTC, they will exchange offers and answers through a signaling server 300 using the SDP protocol. Assuming the signaling server 300 is reachable through the public Internet 400, peer A 200 needs to be able to connect to it.

A signaling server 300 in such a scenario will use a protocol based on either TCP or UDP. The WebRTC protocol does not require a specific protocol to be used, but SIP could be an example of a protocol that can be used in this scenario. So in order to connect to the signaling server 300, peer A 200 is provided (e.g. as part of the peer A client configuration) with a proxy, the signaling server proxy 203, through a specific host, so that it can safely connect to the signaling server 300 through a specific Host.

Figure 3:
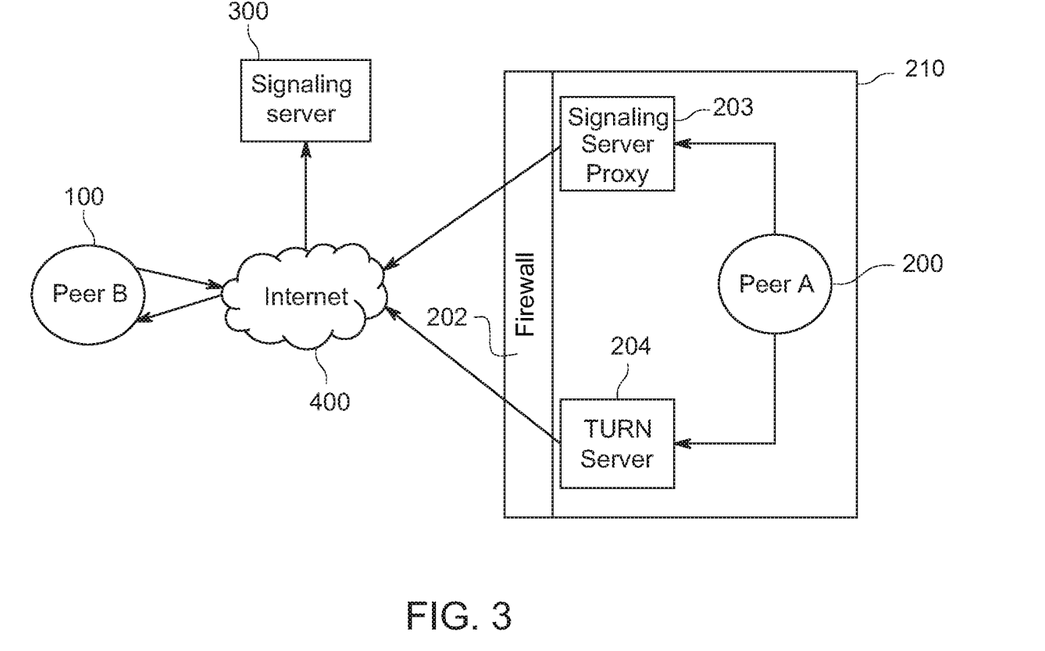
FIG. 3 illustrates an example of the proposed system for using relays for network optimization in IP-based communication networks.

Once the offer/answer exchange has taken place, peer A 200 and peer B 100 start exchanging candidate contact addresses. As previously explained, there are different types of candidate contact addresses in the ICE protocol, but peer A 200 can only use a relayed route, so only relayed candidate contact addresses should be considered. In order to achieve that, in an embodiment, the peer is signaled to filter out any candidate contact address that is not a relayed candidate when gathering and exchanging ICE candidates with the other peer. It is also provided with the address of a TURN server 204 deployed in a specific Host (e.g. a Valid IP Host) as the ICE Servers to use as for the WebRTC protocol. The result of that is peer A 200 will only consider routes to reach peer B 100 that go through the TURN server in the specific Host, so this will fulfill the requirements of the specification. Another consideration is that TURN supports relaying UDP, TCP and TLS. This means that the peer will be able to test candidate contact addresses for the different protocols and find the one that is allowed by the firewall 202. FIG. 3 shows this scenario, where the signaling server proxy 203 and the TURN Server 204 are deployed in hosts that are considered to have the specific properties required, for instance a Valid IP Host or a specific Host that has access to a dedicated link.

An alternative implementation would be to use the signaling server 300 that receives and forwards all the offer/answer exchanges and the ICE candidate contact addresses, to filter out all the IP candidates exchanged between the peers 100, 200 that are not relayed for a valid IP address based on the network policy. This alternative embodiment would allow implementing the method of this invention without imposing changes in the peers. However this option requires implementing in the signaling server 300 some logic that is already implemented in the peers 100, 200 using a WebRTC engine.

Present invention may work with different architectures. Until now, peers 100, 200 have been referred by only indicating that had the goal of exchanging media with each other. It has not been indicated what the peers 100, 200 intend to do with this media.

Figure 4:
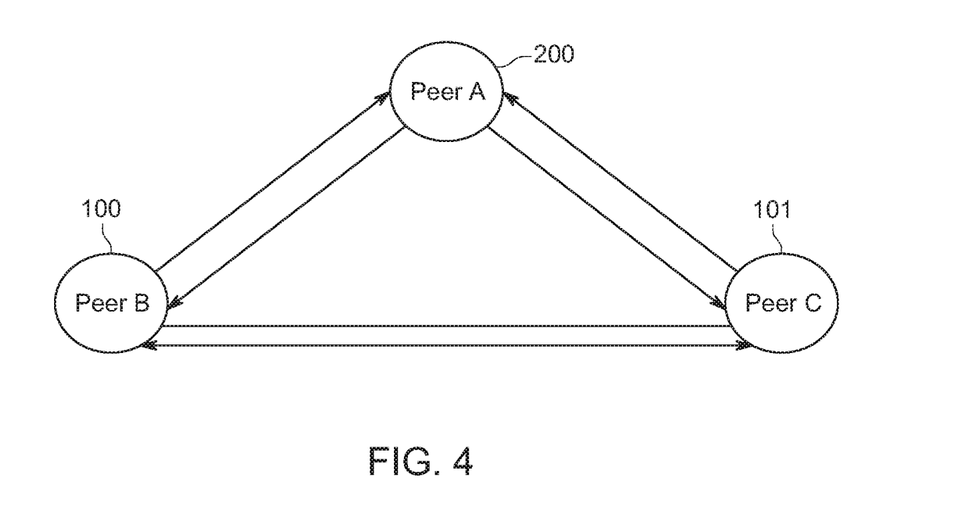
FIGS. 4 to 7 illustrate other different system architectures in which the proposed invention can work.

In a P2P scenario, peer A 200 and peer B 100 may be two endpoints in the Internet 400 that exchange media using the aforementioned protocols. If a third peer, peer C 101, wants to exchange media with them, the same approach will follow. Each peer needs to negotiate with the other peers at an individual level, which means that the P2P case with three peers is just a simple extension of the P2P case with two peers. FIG. 4 shows this configuration of three peers talking to each other in a P2P fashion. This would be an example scenario of three peers, in which each peer sends one media stream to each other peer, and receives one media stream from that one. In this case, each peer negotiates individually with each peer, so the process explained above holds. Also, it should be noted that even though the links between peer A 200 and peer C 101 are direct, it doesn't meant that there are no components in between.

Figure 5:
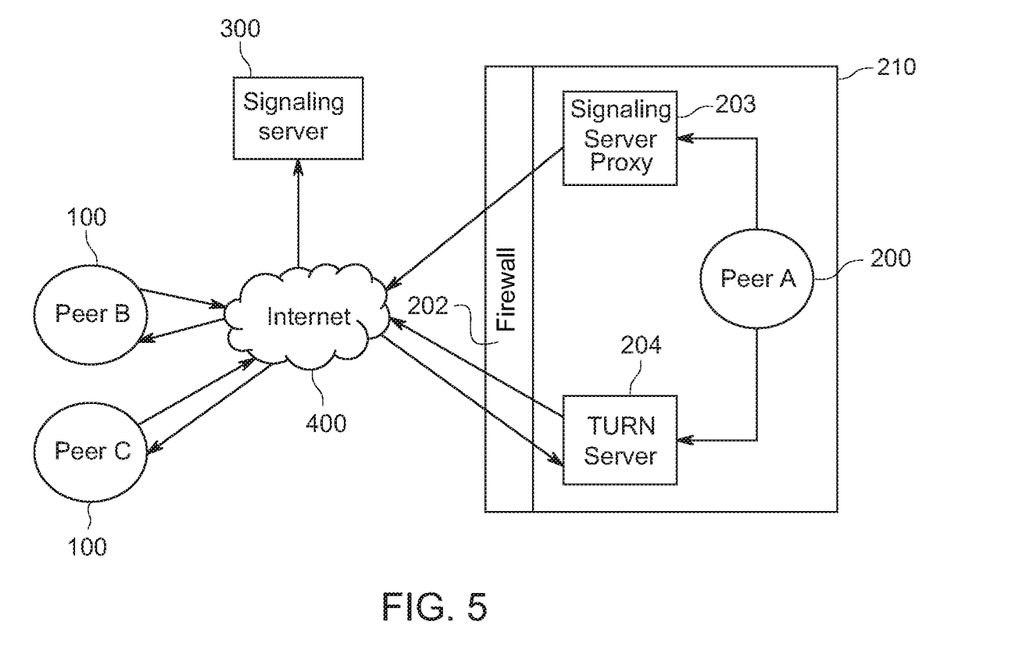

In FIG. 5 it can be seen the P2P case in which peer A 200 is inside a network with restrictions, and peer B 100 and peer C 101 can still reach peer A 200 through the Internet 400. As it can be seen, the fact that now there is a new peer C 101 does not affect the already established links between peer B 100 and peer A 200.

Another architectural approach would be to have a component between the peers, for instance a media server 102, that could act as an SFU or as an MCU, for example, to distribute the streams between peers more efficiently. A media server 102 has the property of being a component in between the peers that relays streams between them. It may have a public IP to make it easier for other peers to reach it, but this is not mandatory. Also, it may implement the protocols already mentioned STUN, ICE and even TURN.

Figure 6:
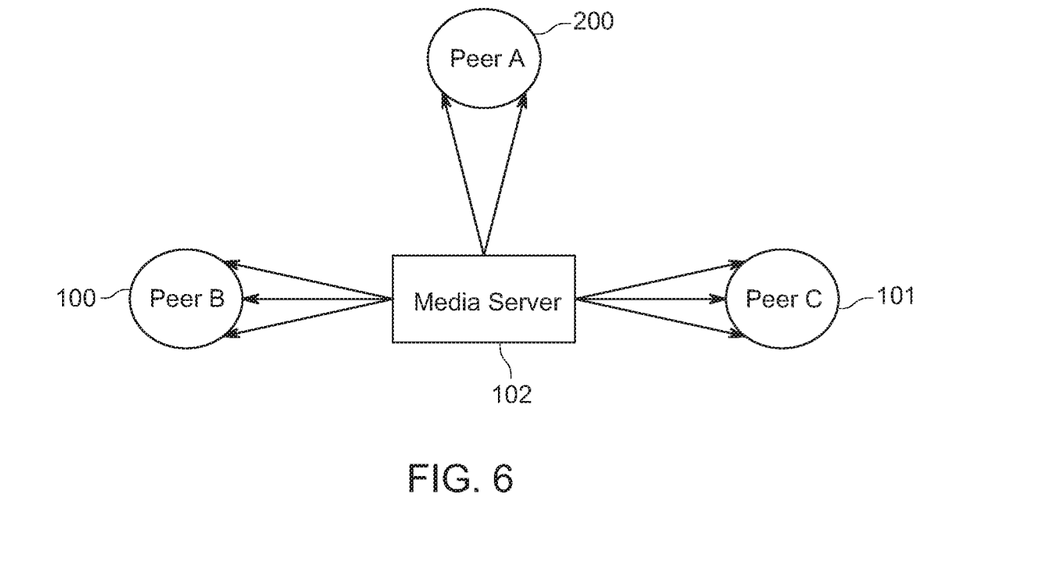

In this case, as illustrated in FIG. 6, a media server 102 would be acting between the peers 100, 101, 200 to relay media between them. However, even though the architecture looks different, it is a deformation of the P2P case, in which each peer 100, 101, 200 only sends to or receives media streams from the media server 102.

Figure 7:
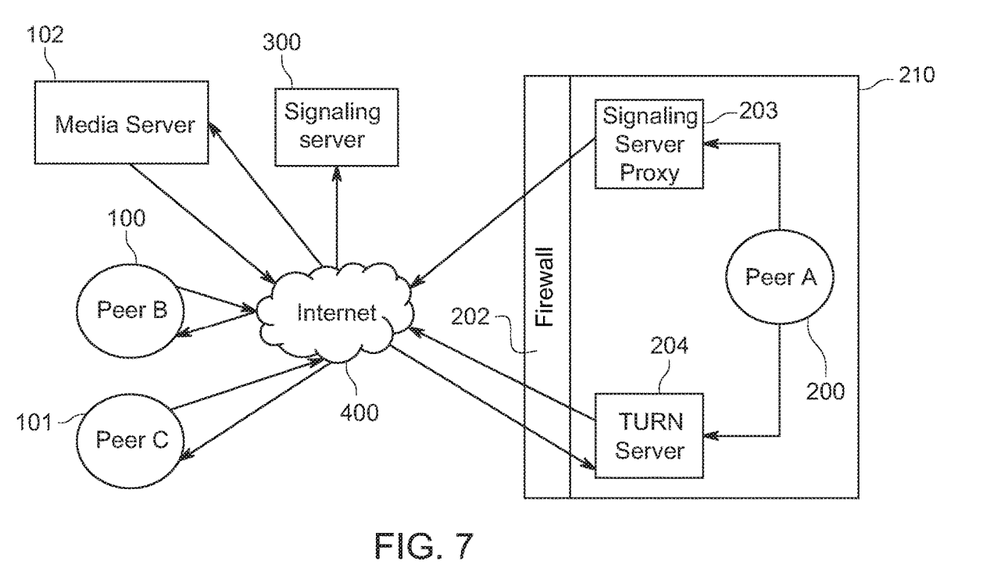

In this configuration, the media server 102 acts as another peer, however it may have the property that of having a public IP to make it easier to reach, although this requirement is not mandatory. In this scenario, see FIG. 7, peer C 101 and peer B 100 would need to exchange media with the media server 102, but since they are not in a restricted network it is not a special case. The special case comes from peer A 200, because it is in a restricted network, however, peer A 200 just needs to reach out to the media server 102 with the protocols mentioned above, and it can reach the media server 102 it would with any other peer.

Figure 8:
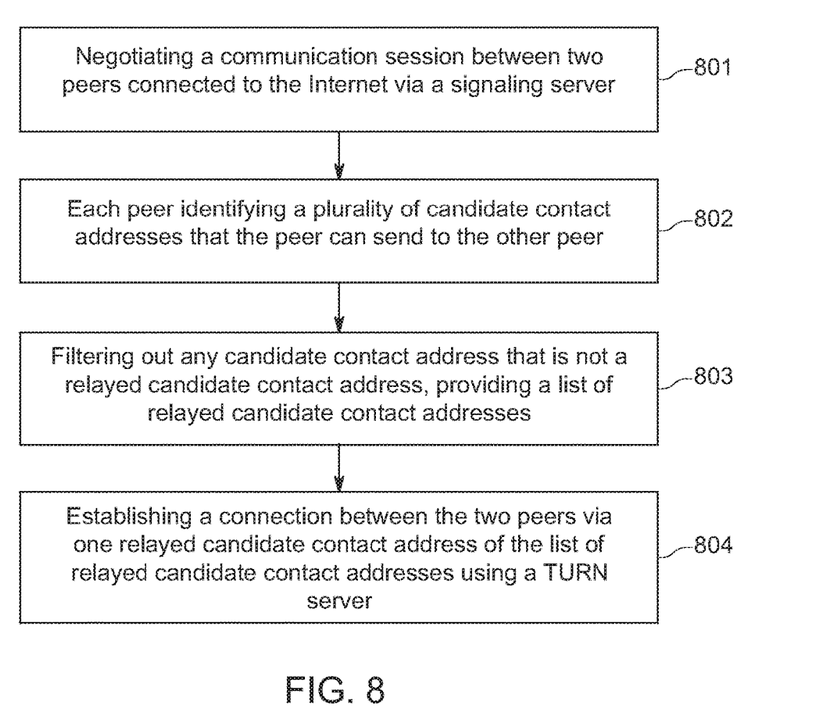
FIG. 8 illustrates a method for using relays for network optimization in IP-based communication networks according to an embodiment of the present invention.

With reference now to FIG. 8, therein it is illustrated an embodiment of the method of connecting two peers on the Internet. According to this embodiment, at step 801 a communication session is negotiated between two peers via the signaling server 300. Both the two peers may have data traffic restrictions and require a relayed route to connect with the other peer or alternatively only one of the peers may suffer said constraints, for instance only peer A as illustrated in the different figures. At step 802, each peer identifies a plurality of candidate contact addresses (e.g. IP address, port and protocol), that the peer can send to the other peer, so that the other peer can find a route to connect to that peer through said contact address. Then, at step 803, a filtering out of the candidate contact address not being relayed candidate contact address is performed, further providing a list of relayed candidate contact addresses. This can be done either by the peer(s) having the data traffic restrictions or by the signaling server 300. Finally, at step 804, a connection between the two peers is established via one relayed candidate contact address of the list of relayed candidate contact addresses using a TURN server.

The methods and systems discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for using relays for network optimization in IP-based communication networks, comprising:
    negotiating, via a signaling server, a communication session between first and second peers connected to the Internet, wherein the first peer has data traffic restrictions and requires a relayed route to connect with the second peer;
    determining that the first peer has data traffic restrictions that require the first peer to use a relayed route to communicate with the second peer by accessing a register that lists IP addresses of peers having data traffic restrictions;
    filtering out one or more candidate contact address that are not relayed candidate contact addresses from a previously identified plurality of candidate contact addresses to provide a list of relayed candidate contact addresses, wherein each candidate contact address comprises an IP address, a port and a communication protocol; and
    establishing a connection between the first and second peers via one relayed candidate contact address of the list of relayed candidate contact addresses using a Traversal Using Relays around NAT (TURN) server.

2. The method of claim 1, wherein the filtering out is performed by the first peer having data traffic restrictions.

3. The method of claim 1, wherein the filtering out is performed by the signaling server.

4. The method of claim 1, wherein the negotiation is performed using an Interactive Connectivity Establishment (ICE) protocol.

5. The method of claim 1, wherein the communication session comprises a RTP session using WebRTC.

6. The method of claim 1, further comprising identifying a plurality of candidate contact addresses, wherein the identification of the candidate contact addresses comprises using Session Traversal Utilities for NAT (STUN) and TURN protocols.

7. The method of claim 1, wherein the signaling server uses the communication protocol based on either TCP or UDP.

8. The method of claim 1, wherein the second peer is a media server acting as a Selective Forwarding Unit (SFU) or as a Multipoint Control Unit (MCU).

9. A first peer computing device comprising at least one processor that is configured to communicate with a second peer computing device over a data network, wherein the first peer is configured to negotiate a communication session with the second peer by:
   identifying a plurality of candidate contact addresses that each include an IP address, a port and a communication protocol that the first peer can send to the second peer and that the second peer can use to connect to the first peer;
   determining that the first peer has data traffic restrictions that require the first peer to use a relayed route to communicate with the second peer by accessing a register that lists IP addresses of peers having data traffic restrictions;
   filtering out any candidate contact addresses that are not relayed candidate contact addresses from the identified plurality of candidate contact addresses to generate a list of relayed candidate contact addresses; and
   establishing a communication session with the second peer via a signaling server using one of the relayed candidate contact addresses using a Traversal Using Relays around NAT (TURN) server.

10. The peer computing device of claim 9, wherein the signaling server is adapted to use an Interactive Connectivity Establishment (ICE) protocol to help establish the communication session between the first and second peers.

11. The peer computing device of claim 9, wherein the communication session comprises a RTP session using WebRTC.

12. The peer computing device of claim 9, wherein the first peer identifies the plurality of the candidate contact addresses using the Session Traversal Utilities for NAT (STUN) and TURN protocols.

13. The peer computing device of claim 9, wherein the signaling server is adapted to use the communication protocol based on either TCP or UDP.

14. The peer computing device of claim 9, wherein the second peer is a media server configured to act as a Selective Forwarding Unit (SFU) or as a Multipoint Control Unit (MCU).

15. A signaling server that is configured to help establish a communication session between a first peer computing device and a second peer computing device, wherein the signaling server is configured to help establish the communication session by:
   receiving, from the first peer, a plurality of candidate contact addresses that each include an IP address, a port and a communication protocol and that the second peer can use to connect to the first peer;
   consulting a register that identifies peers having data traffic restrictions to determine that the first peer has data traffic restrictions that require the first peer to use a relayed route to communicate with the second peer;
   filtering out any candidate contact addresses that are not relayed candidate contact addresses from the plurality of candidate contact addresses to generate a list of relayed candidate contact addresses; and
   helping to establish a communication session between the first peer and the second peer using one of the relayed candidate contact addresses using a Traversal Using Relays around NAT (TURN) server.

16. The signaling server of claim 15, wherein the signaling server is adapted to use an Interactive Connectivity Establishment (ICE) protocol to help establish the communication session between the first and second peers.

17. The signaling server of claim 15, wherein the signaling server is adapted to use the communication protocol based on either TCP or UDP.

18. The signaling server of claim 15, wherein the second peer is a media server configured to act as a Selective Forwarding Unit (SFU) or as a Multipoint Control Unit (MCU).

* * * * *